INVENTOR:
Wilhelm Winzenburg

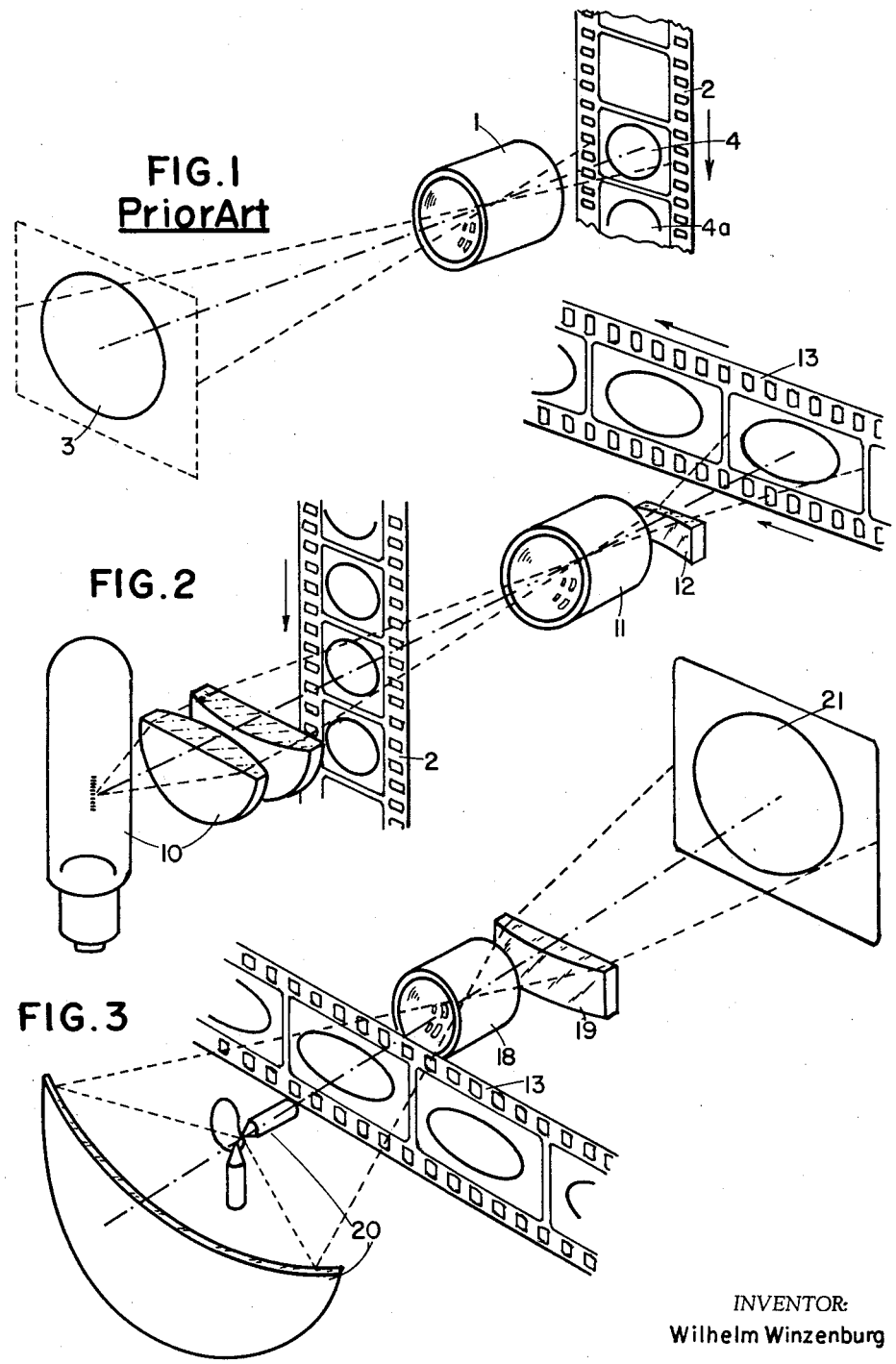

July 31, 1962 W. WINZENBURG 3,046,832
METHOD FOR PRODUCING AND PROJECTING MOTION PICTURES
Filed Feb. 5, 1958 3 Sheets-Sheet 3

INVENTOR:
Wilhelm Winzenburg

United States Patent Office 3,046,832
Patented July 31, 1962

3,046,832
METHOD FOR PRODUCING AND PROJECTING MOTION PICTURES
Wilhelm Winzenburg, Dresden, Germany, assignor to VEB Kamera- und Kinowerke Dresden
Filed Feb. 5, 1958, Ser. No. 713,461
Claims priority, application Germany Feb. 5, 1957
8 Claims. (Cl. 88—16)

The present invention relates to a method for producing and projecting motion pictures and more specifically to a method for taking, printing and projecting motion picture film.

There has been a marked trend during recent years towards larger projection screens in motion picture theaters. This applies particularly to outdoor theaters which require screens of very substantial size. The size of a projection screen at a predetermined picture brightness is limited by the amount of light furnished by the projection apparatus.

It is well known that the total luminous flux is defined by the formula $$\Phi = \nu \pi e F \sin^2 \phi/2$$

wherein $\nu$ is a constant for a given projection system and takes into account the losses caused by the optical system and by the carbon holders employed; $e$ is the luminous intensity of the source of light, F is the area of the projection aperture, and $\phi$ is the angular aperture of the objective.

It is generally recognized that a substantial increase in luminous flux cannot be achieved at this time by improvements relating to the elements $\nu$, $e$, and $\sin^2 \phi/2$ in the above-mentioned formula. It has therefore been attempted to increase the factor F, that is, the projection aperture, by the use of camera film of greater than standard width. Films having a width of 55, 65, and 70 mm. have been recommended. These wide films require entirely new picture taking, printing, and reproduction equipment. They cause, furthermore, a great increase in the amount of film used. It has furthermore been proposed to orient the image on both the camera film and the print film in a transverse position, i.e., in a position turned 90° from the conventional position of frames arranged subjacently with respect to each other. This would result in an increase of the projection aperture by a factor of 3. Because of the change in the path of each individual film advance, this method requires special equipment for taking, printing and projecting pictures. In order to avoid changes in the projection equipment, it has been suggested to prepare a camera film with a negative in the transverse position with frames arranged laterally adjacent each other and of increased size, and to print it on standard 35 mm. film in the normal position at an optical printing stage by reducing its size and turning the frames through an angle of 90°. Such a process significantly reduces graininess of the print, but does not lead to a larger projection aperture.

It is an object of the present invention to increase the luminous flux obtainable from projection equipment by providing a print of greater than standard frame size on standard film.

Another object of the invention is to provide such a print from a camera film of standard frame size.

A further object of the invention is to provide prints of equal frame size for projection of standard and wide-screen images.

In its more specific aspects, the invention contemplates exposing motion picture film of standard frame size in a camera with or without an anamorphotic lens system, printing the camera film in an optical printing stage with an anamorphotic optical system on a print film at right angles to the orientation of the frames on the negative film, whereby the image is enlarged and laterally expanded, and projecting the print so produced without or with an anamorphotic optical system, whereby an image of correct proportions and having an aspect ratio of a standard screen or a panoramic wide screen, respectively, is produced.

Other objects and many of the attendant advantages of this invention will be readily appreciated as the same becomes better understood by reference to the following detailed description when considered in connection with the accompanying drawings, wherein FIG. 1 is a schematic representation of essential elements of a camera for the taking of motion pictures on standard-width motion picture film.

FIG. 2 schematically shows the essential elements of an optical printing machine for performing the printing process of the invention with the film of FIG. 1.

FIG. 3 shows schematically a device for projection of the film printed in the device shown in FIG. 2.

FIG. 2a shows an optical printing device for the printing process of the invention as applied to the film of FIG. 1a.

FIG. 3a shows a device for the projection of the film printed as shown in FIG. 2a.

Figure 4:
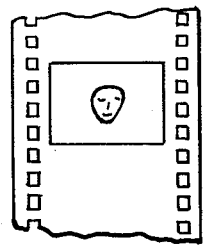

FIG. 4 schematically shows a 35 mm. camera film with a frame exposed in the camera of FIG. 1.

Figure 5:
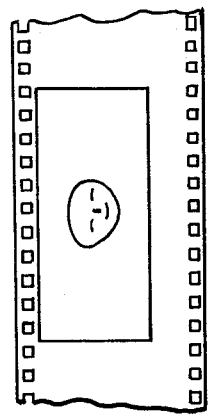

FIG. 5 shows a print produced in the printing device of FIG. 2 from the negative of FIG. 4.

Figure 1A:
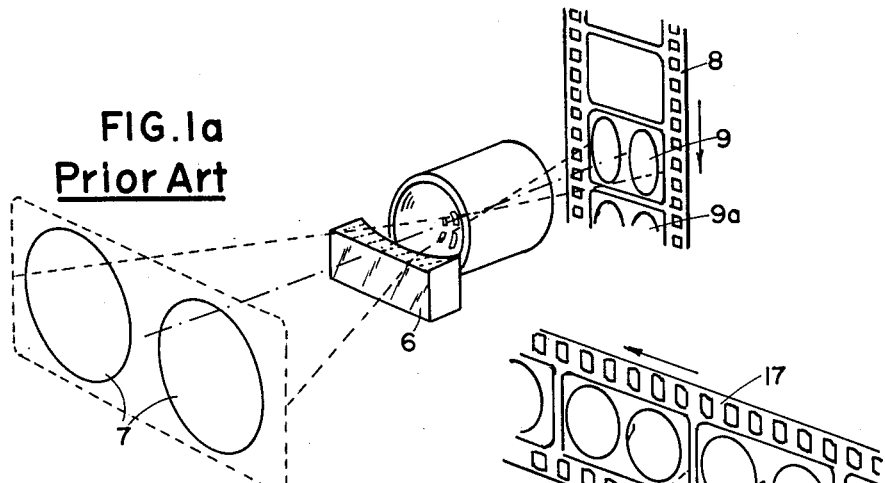
FIG. 1a is a schematic representation of a camera for taking wide-field motion pictures on standard-width film by means of an anamorphotic lens attachment.
Figure 6:
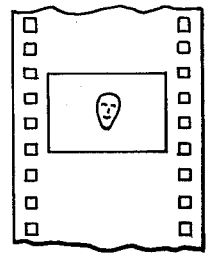

FIG. 6 shows a negative taken by the camera of FIG. 1a.

Figure 2A:
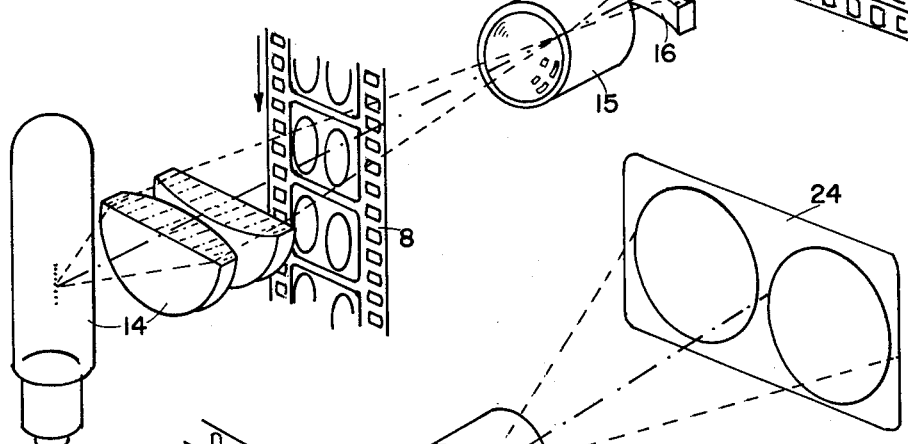
Figure 7:
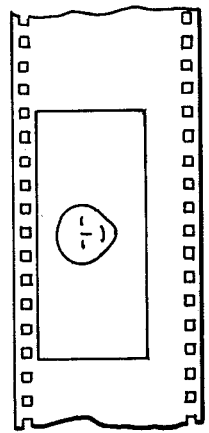

FIG. 7 shows a 35 mm. print produced by the printing process of FIG. 2a from the negative of FIG. 6.

Figure 8:

FIG. 8 shows a 16 mm. print produced by the printing process of FIG. 2 from a negative obtained by the method of FIG. 1.

Figure 9:
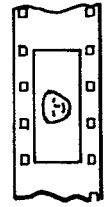

FIG. 9 shows a 16 mm. print produced by the printing process of FIG. 2a from a negative taken by the method of FIG. 1a.

Referring now to the drawings, there is illustrated in FIG. 1 the conventional method of taking moving pictures on 35 mm. motion picture film in a camera. The image of an object 3 is recorded on an intermittently moving negative film 2 by a lens generally indicated by 1, resulting in latent images 4, 4a, etc.

A device for performing the printing process of the invention is illustrated by way of example in FIG. 2. A source of light 10, including a projection bulb and a system of condenser lenses, directs beams of light through the processed film strip 2 produced by exposure as shown in FIG. 1 and through a lens system comprising a standard optical printing lens 11 with an anamorphotic attachment 12 (a negative cylinder lens as described, for example, in a paper of G. H. Cook in the Journal of the Society of Motion Picture and Television Engineers, volume 65, pages 151, etc.) onto print film 13 on which latent images are formed. Film 2 and film 13 are moved intermittently through the printing device in a well-known manner. Film 13 travels in a direction at an angle of 90° to the direction of travel of the camera film 2 in the printing stage, and the planes of the film surfaces are parallel at the printing stage. The object appearing in its natural proportions on the negative film is enlarged and expanded laterally by the anamorphotic lens system on the positive print. The aspect ratio of the print is increased as compared to the aspect ratio of the negative camera film. The standard picture size of 15.2 x 20.9 mm. may, for example, be expanded to a positive image of 20.9 x 41.8 mm., representing the same field of view. The positive print, therefore, has a projection aperture increased by a factor of approximately 2.7 over the aperture of the negative or camera film.

FIG. 3 schematically illustrates a projection device suitable for projecting a print produced from a standard type camera film by the printing process of the invention as shown in FIG. 2. A light source is generally indicated by numeral 20 and may consist of a carbon arc and a parabolic mirror arranged in a well-known manner. Light is passed through print film 13, a projection lens 18, and an anamorphotic attachment 19 which is in effect a positive cylindrical lens, and which restores the aspect ratio of the image projected on screen 21 to that of the original negative produced on the camera film 2 of FIG. 1.

An application of the printing method of the invention to a negative produced with the aid of an anamorphotic camera lens and resulting in a print for projection on a wide screen is illustrated in FIGS. 1a to 3a.

An object 7 is exposed on a standard 35 mm. film 8 by means of a lens 5 having a negative anamorphotic attachment 6. The resulting latent images 9, 9a, etc. are laterally compressed.

The processed negative is then printed in a device illustrated in FIG. 2a and corresponding to that of FIG. 2. A light source, generally indicated at 14, which may comprise an electric bulb and a system of condenser lenses, directs beams of light through the processed film strip 8 produced by exposure as shown in FIG. 1a and through a lens system comprising a standard optical printing lens 15 with an anamorphotic attachment 16 onto a print film 17 on which latent images are formed. Film 17 travels in a direction at right angle to the direction of travel of the camera film 8 in the printing stage. The image which appears laterally compressed in the camera film is expanded laterally on the positive film to the aspect ratio of the original wide field of view of the motion picture taking camera of FIG. 1a. The wide-screen print obtained may have the same aperture, for example 20.9 x 41.8 mm. as the print intended for projection on a screen of standard aspect ratio resulting from the printing process of FIG. 2.

Figure 3A:
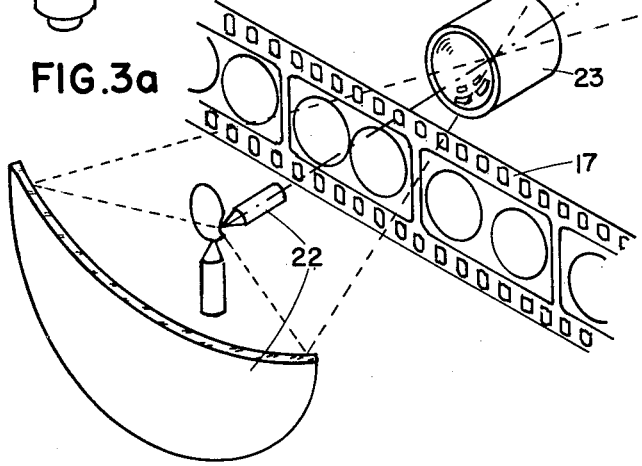

FIG. 3a schematically illustrated the projecting stage required for projecting the print produced by the device of FIG. 2a. A light source comprising a carbon arc and a parabolic mirror is generally indicated at 22. Light is passed through print film 17 and a conventional lens 23, that is: a lens having no anamorphotic effect, and an image having the desired aspect ratio suitable for a wide screen is projected on screen 24.

The films produced by the method of the invention are schematically illustrated in FIGS. 4 to 9.

FIG. 4 shows a 35 mm. film with a frame exposed in a standard camera without distortion.

FIG. 5 shows the print produced from the frame of FIG. 4 in the device of FIG. 2. The image is turned at right angle to the position of the negative; it is enlarged and expanded laterally. This print has to be projected through an anamorphotic lens system to be compressed to the aspect ratio (1:1.37) of the standard screen and to restore the proportions of vertical and horizontal dimensions present in the original camera film.

FIG. 6 shows a negative film with a frame exposed through an anamorphotic lens system used to record a wide angle of view on standard 35 mm. film. The image is compressed laterally.

FIG. 7 shows the print made from the frame of FIG. 6 in the device of FIG. 2a. The image is turned at right angle to the position of the negative; it is enlarged and expanded laterally, whereby the distortion produced in the camera is compensated for. This print is to be projected through a projection lens without anamorphotic attachment and will give a wide-screen image.

FIG. 8 shows a print of the negative frame of FIG. 4 produced on 16 mm. film, and FIG. 9 is a print of the negative frame of FIG. 5 on 16 mm. film. It will be obvious to those skilled in the art that both prints could also be made from corresponding frames produced on 16 mm. camera film.

The printing process of the invention permits the use of conventional cameras without any alteration. No increase in the consumption of negative film is required. Printing the negative so produced with a 90° change in the orientation of the picture on the print film results in a greatly enlarged projection aperture which may exceed that of the negative, for example: by a factor of 3.

The objective aperture in an optical printing stage is substantially smaller than that in the projection stage. When pictures having an increased angular field are compressed laterally by an anamorphotic lens system in the camera, they can be expanded in the optical printing stage to the aspect ratio of the wide screen, resulting in a projected image of a sharpness not obtainable by projecting a laterally compressed print through an anamorphotic projection lens system.

The method of the invention furthermore results in prints of equal frame dimensions whether the projected image is to have the aspect ratio of a standard screen or that of the wide screen. The same aperture plate may, therefore, be used with both types of prints, and a change from one to the other merely requires a change in the lens system.

The method of the invention is also applicable to the printing of a 35 mm. negative onto a 16 mm. or other narrow positive film. A projection aperture twice or three times that of conventional 16 mm. or other narrow film may be produced by transverse arrangement of the picture on the film and will require the film to be advanced in the projection stage by a double or triple step, respectively.

Wide-screen prints thus produced are projected by means of standard projection lenses, whereas laterally expanded prints of negatives of standard aspect ratio are projected through an objective lens with anamorphotic attachment.

The prints with transversely arranged frames may be projected in projection apparatus for vertical film movement by the use of well-known devices for optically rotating the projected image. These prints may also be projected from apparatus in which the print moves horizontally.

The method of the invention applies not only to motion picture film intended for projection in motion picture theaters, but equally to rear projection where an appreciable increase in luminous flux is desirable for wide-screen pictures of panoramic type.

While anamorphotic lenses and lens systems have been employed to illustrate devices adapted to perform the method of the invention, it will be understood by those skilled in the art that other optical devices having an anamorphotic effect, such as prisms, may be employed without departing from the spirit of the invention.

Obviously, many modifications and variations of the present invention are possible in the light of the above teachings. It is therefore to be understood that within the scope of the appended claims the invention may be practiced otherwise than as specifically described.

What is claimed is:

1. In the process of producing and projecting motion picture films, the improvement comprising the steps of passing a camera film, having oblong frames arranged subjacently to each other, exposed in a film camera and developed, through an optical printing stage at right angles with a print film, expanding by optical means the images on said frames of the camera film transversely to the latter, and projection printing the thus expanded images on the frames of said print film adjacently to each other and lengthwise of said print film, increasing thereby the useful aperture area of each of said print film frames for the passage of light during projection as compared to the corresponding camera film frames.

2. In the process of producing and projecting motion picture films, the improvement according to claim 1 wherein the widths of said camera film frames and said print film frames are identical, and wherein said step of projection printing further includes the step of uniformly enlarging by optical means said images of the camera film so that the short edges of said print film frames are substantially of equal length with the long edges of said camera film frames.

3. In the process of producing and projecting motion picture films, the improvement according to claim 1, wherein the width of said print film frames is smaller than that of said camera film frames and wherein said step of projection printing further includes the step of uniformly reducing by optical means said images of the camera film so as to fit said smaller width of said print film frames.

4. In the process of producing and projecting motion picture films, the improvement according to claim 1, further comprising the step of compressing lengthwise by optical means said expanded images of the print film during projection, whereby the projected images have proportions identical with those of the images reaching said camera film frames during exposure.

5. In the process of producing and projecting motion picture films, the improvement according to claim 1, further comprising the step of compressing lengthwise by optical means said images reaching the camera film during exposure, whereby the projected images have proportions identical with those of the images reaching said camera film during exposure before compression and said print film frames while said camera film frames are lengthwise compressed.

6. The method of increasing luminous intensity in projecting motion picture print films, comprising the subsequent steps of recording images on a light-sensitive motion picture camera film by exposing said camera film in a camera to light rays reflected by an object, developing the exposed camera film, projection printing the developed camera film in an optical printing step onto a light-sensitive print film, said printing step including orienting said developed camera film and said print film at right angles with respect to each other, uniformly enlarging said images recorded on said camera film and also additionally enlarging said camera film images only in one planar direction, by means of an anamorphotic optical system, so as to form on said print film images expanded parallel with its longitudinal extension, developing the exposed print film, and exposing said expanded images of the developed print film to a light source in a projector through a picture window having an overall aperture greater than that of said camera film frames, whereby the light beam emitted by said projector is intensified.

7. The method of increasing luminous intensity in projecting motion picture print films according to claim 6, further comprising the step of compressing said expanded print film images in one planar direction only, during said step of exposing to a light source, by means of an anamorphotic optical system, in a sense opposite to said additional enlarging in one planar direction.

8. The method of increasing luminous intensity in projecting motion picture print films according to claim 6, wherein said images on the camera film are recorded from an object having proportions exceeding those of the frames of said camera film in one direction only, further comprising the step of compressing said camera film images in one planar direction only, during said step of recording, by means of an anamorphotic optical system in a sense opposite to said additional enlarging in one planar direction.

References Cited in the file of this patent

UNITED STATES PATENTS

| | | |
|---|---|---|
| 1,032,172 | Zollinger | July 9, 1912 |
| 1,372,936 | Clark | Mar. 29, 1921 |
| 1,829,634 | Chretien | Oct. 27, 1931 |
| 1,938,808 | Ceccarini | Dec. 12, 1933 |
| 2,235,925 | Gilmore | Mar. 25, 1941 |
| 2,786,388 | O'Brien et al. | Mar. 26, 1957 |

FOREIGN PATENTS

| | | |
|---|---|---|
| 580,756 | Canada | Aug. 4, 1959 |
| 1,135,048 | France | Dec. 10, 1956 |

OTHER REFERENCES

Cook, G. H.: "Recent Developments in Anamorphotic Systems," pages 61–71 of British Kinematography, vol. 26, No. 3, March 1955.